US009065446B1

(12) United States Patent
Savithri et al.

(10) Patent No.: US 9,065,446 B1
(45) Date of Patent: Jun. 23, 2015

(54) GENERATING DELAY VALUES FOR DIFFERENT CONTEXTS OF A CIRCUIT

(71) Applicant: Xilinx, Inc., San Jose, CA (US)

(72) Inventors: Nagaraj Savithri, Plano, TX (US); Amit Gupta, San Jose, CA (US); Fu-Hing Ho, Los Gatos, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/294,406

(22) Filed: Jun. 3, 2014

(51) Int. Cl.
*G06F 17/50* (2006.01)
*H03K 19/177* (2006.01)

(52) U.S. Cl.
CPC ...... *H03K 19/17792* (2013.01); *H03K 19/1774* (2013.01); *G06F 17/5031* (2013.01); *G06F 17/5045* (2013.01)

(58) Field of Classification Search
CPC ............ G06F 17/5054; G06F 17/5045; G06F 17/5031; G06F 2217/12; H03K 19/17792; H03K 19/1774
USPC .............. 326/38–41; 716/101, 106, 100, 111, 716/113, 115
See application file for complete search history.

(56) References Cited

U.S. PATENT DOCUMENTS

| 7,346,874 | B1 * | 3/2008 | Burks ........................... 716/113 |
| 7,487,486 | B2 * | 2/2009 | Celik et al. .................... 716/134 |
| 7,577,929 | B1 * | 8/2009 | Hutton et al. ................. 716/108 |
| 7,739,095 | B2 * | 6/2010 | Lin et al. ........................ 703/14 |
| 7,865,753 | B2 * | 1/2011 | Alexander et al. ............ 713/323 |
| 7,970,590 | B1 * | 6/2011 | Burks .............................. 703/2 |
| 8,584,075 | B2 * | 11/2013 | Datta et al. .................... 716/136 |
| 8,645,881 | B1 * | 2/2014 | Kriplani et al. ................. 716/56 |

* cited by examiner

*Primary Examiner* — Vibol Tan
(74) *Attorney, Agent, or Firm* — LeRoy D. Maunu

(57) ABSTRACT

Approaches for generating delay values for instances of a circuit include inputting possible contexts of the circuit. Each context includes a respective delay value and a combination of possible types of a plurality of characteristics of the circuit, and each characteristic is of one type of a plurality of alternative types of the characteristic. A plurality of classification parameters is input and the classification parameters indicate selected ones of the characteristics. Groups of contexts are selected based on the plurality of classification parameters. Each group includes one or more of the contexts, and each context includes the plurality of characteristics. A combination of types of the selected characteristics in each context in a group is equal to the combination of types of the selected characteristics of each other context in the group. For each group, a mean and a standard deviation of the respective delay values are determined and output.

20 Claims, 7 Drawing Sheets

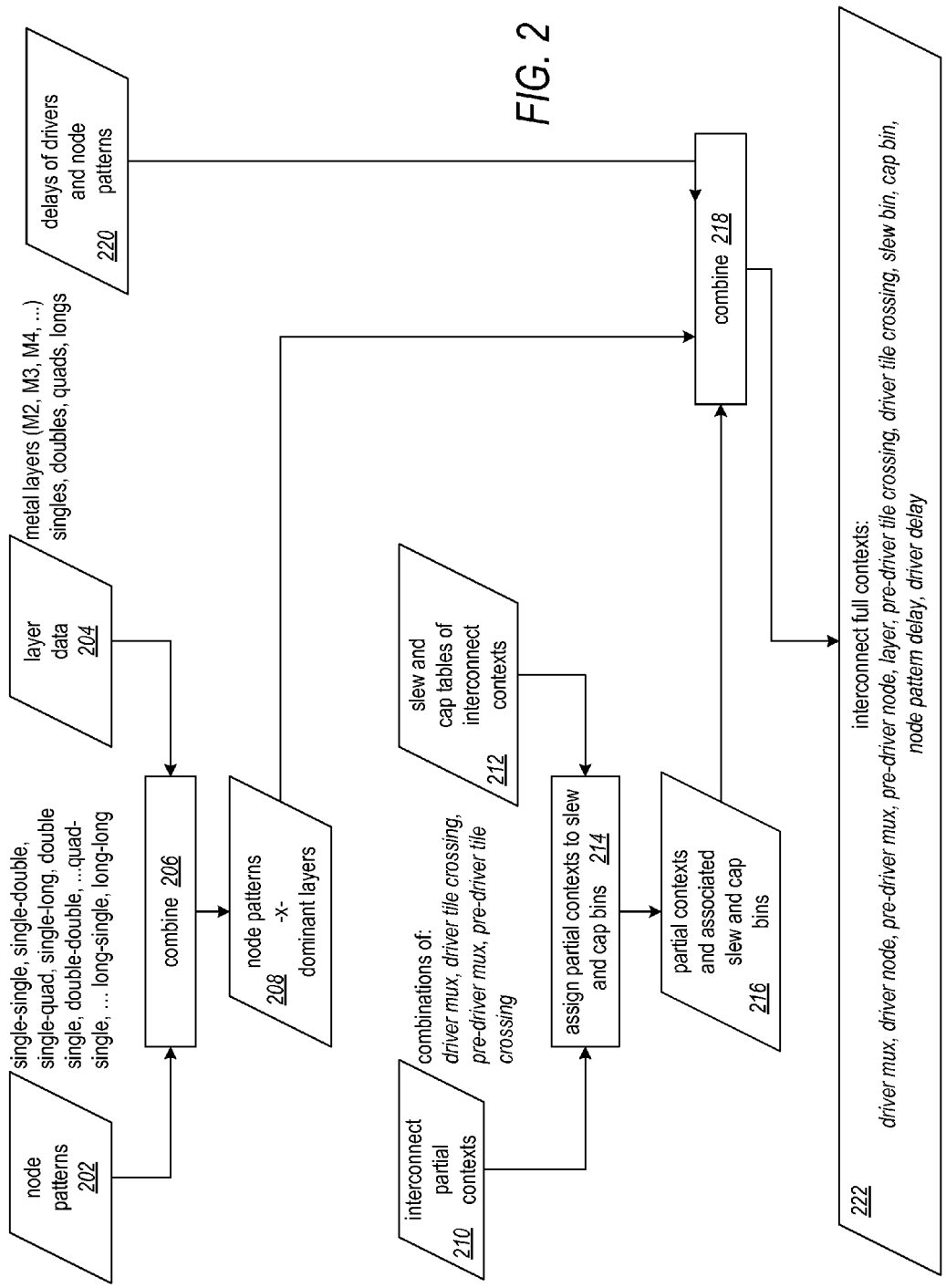

| context | driver mux | driver node | pre-driver mux | pre-driver node | dominant layer | pre-driver tile x-ings | driver tile x-ings | slew bin | capacitance bin | node delay | driver delay |
|---|---|---|---|---|---|---|---|---|---|---|---|
| 1 | muxi | type | muxi | type | Mx | tile(s) ID | tile(s) ID | bin ID | bin ID | floating point | floating point |
| 2 | muxi | type | muxi | type | Mx | tile(s) ID | tile(s) ID | bin ID | bin ID | floating point | floating point |
| 3 | muxi | type | muxi | type | Mx | tile(s) ID | tile(s) ID | bin ID | bin ID | floating point | floating point |
| 4 | muxi | type | muxi | type | Mx | tile(s) ID | tile(s) ID | bin ID | bin ID | floating point | floating point |
| 5 | muxi | type | muxi | type | Mx | tile(s) ID | tile(s) ID | bin ID | bin ID | floating point | floating point |
| 6 | muxi | type | muxi | type | Mx | tile(s) ID | tile(s) ID | bin ID | bin ID | floating point | floating point |
| 7 | muxi | type | muxi | type | Mx | tile(s) ID | tile(s) ID | bin ID | bin ID | floating point | floating point |
| 8 | muxi | type | muxi | type | Mx | tile(s) ID | tile(s) ID | bin ID | bin ID | floating point | floating point |
| 9 | muxi | type | muxi | type | Mx | tile(s) ID | tile(s) ID | bin ID | bin ID | floating point | floating point |
| 10 | muxi | type | muxi | type | Mx | tile(s) ID | tile(s) ID | bin ID | bin ID | floating point | floating point |
| ... | ... | ... | ... | ... | ... | ... | ... | ... | ... | ... | ... |

Table 500:

| context | driver mux | driver node | pre-driver mux | slew bin | capacitance bin | driver delay |
|---|---|---|---|---|---|---|
| 1 | muxa | single | muxb | 1 | 1 | 73.70 |
| 2 | muxa | single | muxb | 2 | 1 | 32.42 |
| 3 | muxb | double | muxb | 1 | 2 | 40.72 |
| 4 | muxa | single | muxd | 2 | 1 | 55.91 |
| 5 | muxc | single | muxb | 1 | 1 | 63.96 |
| 6 | muxb | double | muxb | 3 | 1 | 9.44 |
| 7 | muxa | single | muxc | 1 | 2 | 25.50 |
| 8 | muxa | single | muxc | 2 | 1 | 30.95 |
| 9 | muxa | single | muxc | 1 | 1 | 89.97 |
| 10 | muxa | single | muxb | 1 | 2 | 12.01 |

FIG. 6

Table 600:

| group | context | driver mux | driver node | pre-driver mux | slew bin | capacitance bin | driver delay | mean | std. dev. |
|---|---|---|---|---|---|---|---|---|---|
| 1 | 1 | muxa | single | muxb | 1 | 1 | 73.70 | 39.37 | 31.42 |
| 1 | 2 | muxa | single | muxb | 2 | 1 | 32.42 | | |
| 1 | 10 | muxa | single | muxb | 1 | 2 | 12.01 | | |
| 2 | 7 | muxa | single | muxc | 1 | 2 | 25.50 | 48.81 | 35.75 |
| 2 | 8 | muxa | single | muxc | 2 | 1 | 30.95 | | |
| 2 | 9 | muxa | single | muxc | 1 | 1 | 89.97 | | |
| 3 | 4 | muxa | single | muxd | 2 | 1 | 55.91 | 55.91 | - |
| 4 | 3 | muxb | double | muxb | 1 | 2 | 40.72 | 25.08 | 22.12 |
| 4 | 6 | muxb | double | muxb | 3 | 1 | 9.44 | | |
| 5 | 5 | muxc | single | muxb | 1 | 1 | 63.96 | 63.96 | - |

GENERATING DELAY VALUES FOR DIFFERENT CONTEXTS OF A CIRCUIT

FIELD OF THE INVENTION

The disclosure generally relates to generating delay values for a circuit in different contexts.

BACKGROUND

Programmable logic devices (PLDs) are a well-known type of programmable integrated circuit (IC) that can be programmed to perform specified logic functions. One type of PLD, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component Interconnect Express (PCIe) and Ethernet and so forth.

Each programmable tile may include both programmable interconnect and programmable logic. The programmable interconnect typically includes a large number of interconnect lines of varying lengths interconnected by programmable interconnect points (PIPs). In some FPGAs, the interconnect lines may include single, double, quad, and long lines, which refer to the relative lengths of the interconnect lines. The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Qualifying a programmable IC for purposes of determining a maximum clock rate at which the IC may be operated can be challenging, because programmable ICs are highly configurable. For example, the delay through a PIP is highly dependent on the context in which the PIP is used. Assuming a context that assumes a worst case delay for the context of a PIP may result in an underestimation of the maximum clock rate. Attempting to evaluate all possible combinations of PIP contexts for connections involving multiple PIPs may not be computationally feasible.

SUMMARY

In one embodiment, a method of generating delay values for instances of a circuit includes inputting a plurality of contexts of the circuit. Each context includes a respective delay value and a combination of possible types of a plurality of characteristics of the circuit, and each characteristic is of one type of a plurality of alternative types of the characteristic. A plurality of classification parameters is input. The classification parameters indicate selected ones of the characteristics, and each of the plurality of characteristics not indicated by a classification parameter is a non-selected characteristic. Groups of contexts are selected based on the plurality of classification parameters. Each group includes one or more of the contexts, and each context includes the plurality of characteristics. A combination of types of the selected characteristics in each context in a group is equal to the combination of types of the selected characteristics of each other context in the group. The method determines for each group and from the contexts in each group, a mean and a standard deviation of the respective delay value. The mean and standard deviation of each group are output.

In another embodiment, a method of generating delay values for instances of a circuit includes inputting a plurality of contexts. Each context includes a respective delay value and a combination of possible types of a plurality of characteristics of the circuit, and each characteristic is of one type of a plurality of alternative types of the characteristic. A plurality of sets of classification parameters are input, and the classification parameters in each set indicate selected ones of the plurality of characteristics. Each of the plurality of characteristics not indicated by a classification parameter is a non-selected characteristic. For each set of classification parameters, the method selects groups of contexts based on the classification parameters of the set. Each group includes one or more of the contexts, and each context includes the plurality of characteristics. A combination of types of the selected characteristics in each context in a group is equal to the combination of types of the selected characteristics of each other context in the group. The method determines for each group and from the contexts in each group, a respective mean and a respective standard deviation of the respective delay values. The method determines from the respective standard deviations, a composite mean of the respective standard deviations and a composite standard deviation for the set of classification parameters. One of the sets of classification parameters is selected based on the composite standard deviations for the plurality of sets of classification parameters, and data indicating the selected one set of classification parameters is output.

A system for generating delay values for instances of a circuit is provided in another embodiment. The system includes a memory arrangement and a processor coupled to the memory arrangement. The memory arrangement is configured with instructions that when executed by the processor cause the process to input a plurality of contexts. Each context includes a respective delay value and a combination of possible types of a plurality of characteristics of the circuit, and each characteristic is of one type of a plurality of alternative types of the characteristic. A plurality of classification parameters is also input. The classification parameters indicate selected ones of the characteristics, and each of the plurality of characteristics not indicated by a classification parameter is a non-selected characteristic. Groups of contexts are selected based on the plurality of classification parameters. Each group includes one or more of the contexts, and each context includes the plurality of characteristics. A combination of types of the selected characteristics in each context in a group is equal to the combination of types of the selected characteristics of each other context in the group. For each group and from the contexts in each group, a mean and a standard deviation of the respective delay value are determined. The mean and standard deviation of each group are output.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which:

FIG. 2 shows a data flow diagram that illustrates construction of a data structure that describes the possible combinations of characteristic types of an interconnect circuit;

FIG. 3 is a table that shows the interconnect full contexts for an interconnect circuit;

FIG. 5 is a table that shows examples of contexts for an interconnect circuit;

FIG. 6 is a table that shows examples of groups of contexts selected based on driver mux, driver node, and pre-driver mux being selected as classification parameters;

DETAILED DESCRIPTION OF THE DRAWINGS

Figure 1:
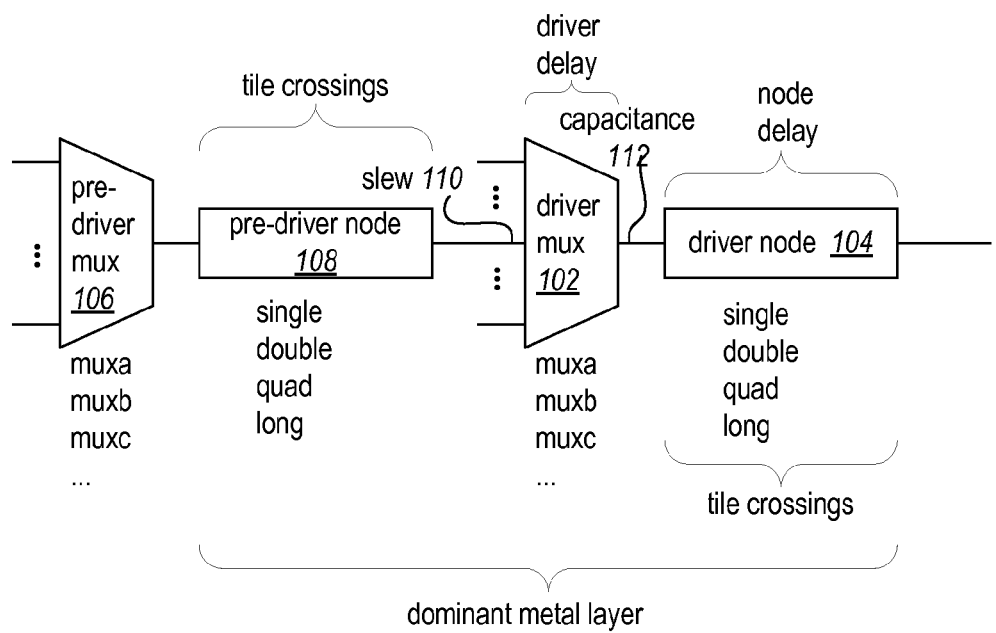
FIG. 1 shows an example of an interconnect circuit and the associated characteristics and alternative types of the characteristics that may affect the delay of the interconnect circuit.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same items; however, in alternative examples the items may be different.

The disclosed examples relate to an interconnect circuit in a programmable integrated circuit (IC), such as the PIPs in a field programmable gate array (FPGA). It will be recognized, however, that the disclosed methods and systems are not limited to FPGAs and may be applied to nearly any circuit of which there may be numerous instances on an IC die and for which there are a large number of different contexts in which the circuit may be configured.

The disclosed approaches for generating delay values for instances of a circuit in different contexts generally include assembling data that describe all possible combinations of contexts for a circuit. Delay values, such as those that have been determined from a SPICE simulation, for example, are associated with the different contexts. Each different context of the circuit includes a delay value and respective types of the possible characteristics of the circuit.

Depending on the circuit, tens or even hundreds of thousands of different contexts are reduced to a desirable number of groups of contexts. Each group has an associated delay value that is generated based on the delay values of the different contexts in that group. The groups of contexts are selected based on input classification parameters, which may be specified by a user. The classification parameters indicate a selected subset of the possible characteristics.

Each group includes one or more of the contexts, and each context includes the possible characteristics. The combination of types of the selected characteristics in each context in a group is equal to the combination of types of the selected characteristics of each other context in the group. In other words, the selected characteristics of each context in a group have the same types as the types of the selected characteristics of each other context in the group. For each group, a mean and standard deviation are determined from the delay values associated with the contexts of the group. The means and standard deviations may be output and then subsequently used in characterizing an integrated circuit (IC) and correlating clock speeds with the IC. In addition, different sets of classification parameters may be used to generate different sets of groups for comparison.

FIG. 1 shows an example of an interconnect circuit and the associated characteristics and alternative types of the characteristics that may affect the delay of the interconnect circuit. The interconnect circuit includes a driver mux 102 and a driver node 104. The context of the interconnect circuit includes the types of the characteristics of the driver mux and driver node, along with the types of the characteristics of the pre-driver mux 106 and the pre-driver node 108. The types of the characteristics of the driver mux include the different types of multiplexers (muxes) that may implement the interconnect circuit. For example, in some XILINX FPGAs, the different types of muxes include muxa, muxb, muxc, etc., in which each different type of mux has a different number of inputs. The multiplexer characteristics of the pre-driver mux 106 may have muxes of types similar to those of the driver mux 102. The types of the characteristics of the driver node 104 include the different lengths of signal lines that may be connected to the driver mux 102. In XILINX some FPGAs, for example, the types of driver nodes include single, double, quad, and long. The characteristics of the pre-driver node 106 may have types similar to those of the driver node.

Slew and capacitance are two additional characteristics that affect the delay of the interconnect circuit. The slew characteristic is the slew at an input pin 110 of the driver mux, and the capacitance characteristic is the capacitance at the output pin 112 of the driver mux. In an example implementation, the type of the slew characteristic is a bin number in which the bin number corresponds to a range of slew values. Similarly, the type of the capacitance characteristic is a bin number in which the bin number corresponds to a range of capacitance values.

Tile crossings of the driver node 104 and tile crossings of the pre-driver node 108 are additional characteristics that define the context of the interconnect circuit. The type of a tile crossing indicates a set of one or more tiles that the node crosses. For example, tiles in an FPGA may include CLB tiles, IOB tiles, BRAM tiles, DSP tiles etc. The type of the tile crossing indicates one or more of the tiles. For example, the type of a tile crossing may be CLB/BRAM/IOB.

The dominant metal layer of the driver node 104 and the pre-driver node 108 is another characteristic that defines the context of the interconnect circuit. The dominant metal layer is the metal layer occupied by the majority of the combination of the pre-driver node and the driver node. For example, if the pre-driver node was a single line in metal layer M2, and the driver node was a long line in metal layer M4, the dominant metal layer would be M4 since the driver node is a long line and the majority of the area occupied by the combination of a single line and a long line is occupied by the long line.

FIG. 2 shows a data flow diagram that illustrates construction of a data structure that describes the possible combinations of characteristic types of an interconnect circuit. Node patterns 202 and layer data 204 are input to a combine block 206. The node patterns specify the possible combinations of types of pre-driver node and driver node, such as single-single, single-double, single-quad, single-long, double-single, double-double, double-quad, double-long, quad-single, quad-double, quad-quad, quad-long, long-single, long-double, long-quad, and long-long. The layer data indicate the metal layer occupied each of the types of pre-driver node and driver node. For example, the layer data indicate one of metal layers M2, M3, M4, etc. for each of the types of nodes. The combine block 206 combines the node patterns with the layer data to create a cross reference table 208 that specifies the dominant layer for each node pattern.

Interconnect partial contexts 210 and data from the slew and capacitance tables 212 are input to block 214, which assigns the partial contexts to slew bins and capacitance bins. The partial contexts include the possible combinations of types of driver mux, driver node tile crossing, pre-driver mux, and pre-driver node tile crossing. The slew and capacitance tables 212 have slew values and capacitance values for the different types of driver and pre-driver muxes. Block 214 creates ranges of slew values and ranges of capacitance values and associates the ranges with bin identifiers. Each partial context is then associated with one of the slew bins and one of the capacitance bins. The partial contexts and associated slew bins and capacitance bins are shown as data element 216.

The combine block 218 inputs the table 208 of cross referenced node patterns and dominant layers, the partial contexts and associated slew bins and capacitance bins 216, and delay values of node patterns, which are shown as data element 220. The delay values 220 indicate previously computed delays of the different types of drivers and of the node patterns 202. The combine block 218 combines the data to generate the possible combinations of the full contexts of the interconnect circuit. The possible combinations are shown as data element 222. Each context of the possible combinations specifies a type of the driver mux, a type of the driver node, a type of the pre-driver mux, a type of the pre-driver node, a dominant metal layer, a pre-driver tile crossing, a driver tile crossing, a slew bin, a capacitance bin, node pattern delay value, and a driver delay value.

FIG. 3 is a table that shows the interconnect full contexts for an interconnect circuit. The table 300 shows details of the data element 222 of FIG. 2. Each context includes one combination of the possible types of the characteristics of the interconnect circuit. Each context of the possible combinations specifies a type of the driver mux, a type of the driver node, a type of the pre-driver mux, a type of the pre-driver node, a dominant metal layer, a pre-driver tile crossing, a driver tile crossing, a slew bin, a capacitance bin, node pattern delay value, and a driver delay value. The entries in the table are shown as variables of the different possible types. The types of the driver mux and the pre-driver mux are shown as muxi, the types of the driver and pre-driver nodes are shown as type, the types of the dominant metal layer are shown as Mx, the types of the tile crossings for the pre-driver and the driver are shown as tile(s) ID, the types of the slew bins and the capacitance bins are shown as bin ID, and the associated delay values are shown as floating point.

Figure 4:
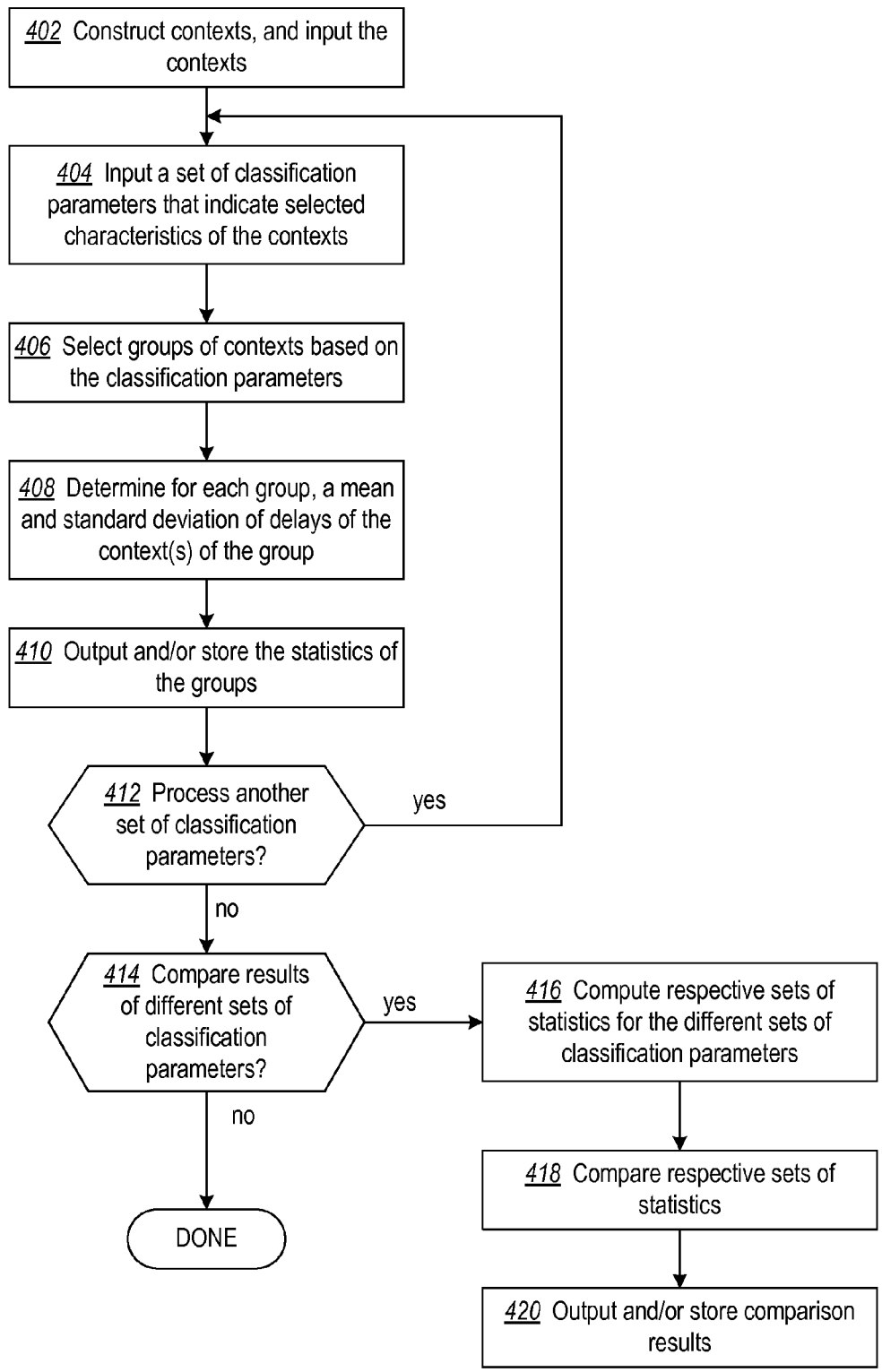
FIG. 4 is a flowchart of a process of generating delay values of interconnect circuits.

FIG. 4 is a flowchart of a process of generating delay values of interconnect circuits. At block 402, the possible contexts are constructed and input for further processing. The contexts may be stored in a hash table or similar database. A set of classification parameters is input at block 404. The classification parameters in the set indicate selected ones of the characteristics and may be specified by a user who desires to reduce the number of circuit contexts. At block 406, groups of contexts are selected based on the plurality of classification parameters.

Each group includes one or more contexts. Each context includes the characteristics of the interconnect circuit. For each context in a group, the combination of types of the selected characteristics is equal to the combination of types of the selected characteristics of each other context in the group. Block 408 determines a mean and standard deviation of the delay values of the contexts of each group. A first mean and standard deviation may be determined from the node delays in a group, and a second mean and standard deviation may be determined from the driver delays in a group. The computed means and standard deviations may then be output for display to a user or stored for further processing for future reference at block 410.

Blocks 412-418 describe processing for comparing statistics generated from different sets of classification parameters. At decision block 412, the process returns to block 404 to input another set of classification parameters if comparison of different sets of classification parameters is desired. Decision block 414 directs the process to block 416 if comparison of different sets of classification parameters is desired and all sets of classification parameters have been input and processed.

At block 416, the process computes respective sets of statistics for the different sets of classification parameters. For example, for each set of classification parameters, a composite mean and composite standard deviation may be computed. The composite mean for a set of classification parameters is a mean of the standard deviations of the groups. The composite standard deviation for a set of classification parameters is the standard deviation from the mean of the standard deviations of the groups. The composite standard deviations of the different sets of classification parameters provides an indication as to how the standard deviations of the groups generated by one set of classification parameters compare to the standard deviations of the groups generated by another set of classification parameters.

At block 418, the statistics from the different sets of classification parameters are compared. In one implementation, the composite standard deviation of each set of classification parameters may be compared to a threshold standard deviation or a range of standard deviations. The set of classification parameters having a composite standard deviation that satisfies the threshold may be selected indicated to a user with output data. At block 420, the results of the comparison are output and/or stored.

FIGS. 5 and 6 show an example in which classification parameters are applied to the possible contexts of an interconnect circuit. FIG. 5 shows a table 500 having examples of contexts for an interconnect circuit. The characteristics of FIG. 5 are a subset of the characteristics shown in FIG. 3 in order to simplify the example.

The characteristics of the interconnect circuit in the example of FIG. 5 include driver mux, driver node, pre-driver mux, slew bin, capacitance bin, and the driver delay. Ten contexts are shown with the types specified for the possible characteristics in each of the contexts. For example, in context 5, the driver mux has a type muxc, the driver node has a type single, the pre-driver mux has a type muxb, the slew bin is of type 1, the capacitance bin is of type 1, and the driver delay has a value of 63.96 picoseconds.

FIG. 6 shows a table 600 having examples of groups of contexts selected based on driver mux, driver node, and pre-driver mux being selected as classification parameters. The classification parameters indicate the selected characteristics that are used to form the groups.

Contexts 1, 2, and 10 are in group 1. It can be seen from the contexts that the types of the selected characteristics driver mux, driver node, and pre-driver mux are equal for each context in the group. Specifically, each context has a driver mux of type muxa, a driver node of type single, and a pre-driver mux of type muxb. The combinations of types of the non-selected characteristics of the contexts in a group are not equal to one another. For the combinations of slew bins and capacitance bins are 1 and 1 for context 1, 2 and 1 for context 2, and 1 and 2 for context 10.

The combination of types of the selected characteristics in each group is not equal to the combination of types of the selected characteristics of each other group. For example, in group 2, the driver mux is a muxa, the driver node is a single, and the pre-driver node is a muxc. None of groups 1, 3, 4, or 5 has a combination of types of driver mux, driver node, and pre-driver mux of muxa, single, and muxc.

For each group, a mean and a standard deviation are calculated from the driver delay values of the contexts in the group. The standard deviation indicates the quality of the grouping resulting from the chosen classification parameters. Lower standard deviations indicate a better grouping than higher standard deviations. Note that group 1 has a standard deviation of 31.42 and a mean of 39.37. Similarly, the standard deviations of groups 2 and 4 are also relatively high as compared to the respective means. Thus, the set of classification parameters that indicate the selected characteristics driver mux, driver node, and pre-driver mux may not be suitable for determining delay values for the different contexts of the interconnect circuit. Better results may be obtained by specifying more classification parameters in the set.

Figure 7:
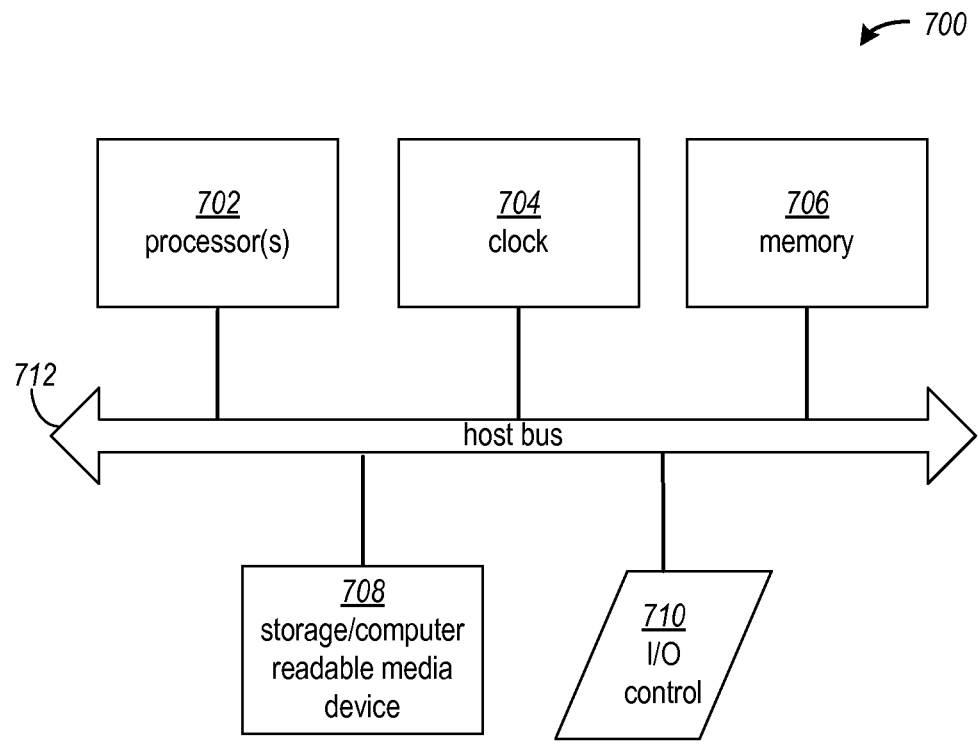
FIG. 7 shows an example of a computing arrangement on which the disclosed processes and data structures may be implemented.

FIG. 7 shows an example of a computing arrangement on which the disclosed processes and data structures may be implemented. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 700 includes one or more processors 702, a clock signal generator 704, a memory arrangement 706, a storage arrangement 708, and an input/output control unit 710, all coupled to a host bus 712. The arrangement 700 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 702 may be one or more general purpose processors, or a combination of one or more general purpose processors and suitable co-processors, or one or more specialized processors (e.g., RISC, CISC, pipelined, etc.).

The memory arrangement 706 typically includes multiple levels of cache memory, and a main memory. The storage arrangement 708 may include local and/or remote persistent storage, such as provided by magnetic disks (not shown), flash, EPROM, or other non-volatile data storage. The storage unit may be read or read/write capable. Further, the memory arrangement 706 and storage arrangement 708 may be combined in a single arrangement.

The processor(s) 702 executes the software in storage arrangement 708 and/or memory arrangement 706, reads data from and stores data to the storage arrangement 708 and/or memory arrangement 706, and communicates with external devices through the input/output control arrangement 710. These functions are synchronized by the clock signal generator 704. The resource of the computing arrangement may be managed by either an operating system (not shown), or a hardware control unit (not shown).

Figure 8:
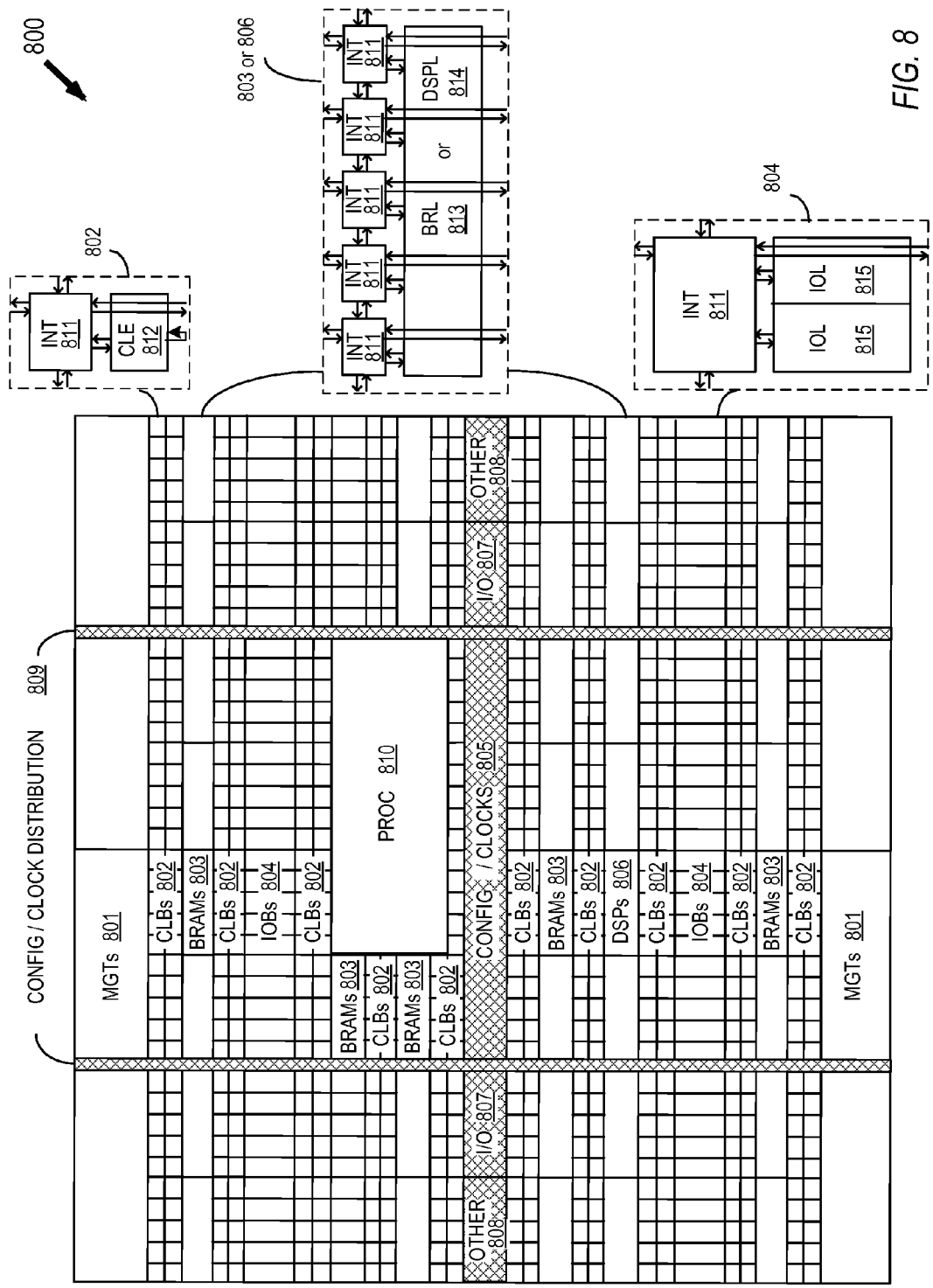
FIG. 8 shows an example of a programmable IC that may contain the interconnect circuits that are modeled according to the disclosed processes and data structures.

FIG. 8 shows an example of a programmable IC that may contain the interconnect circuits that are modeled according to the disclosed processes and data structures. FPGAs can include several different types of programmable logic blocks in the array. For example, FIG. 8 illustrates an FPGA architecture (800) that includes a large number of different programmable tiles including multi-gigabit transceivers (MGTs) 801, configurable logic blocks (CLBs) 802, random access memory blocks (BRAMs) 803, input/output blocks (IOBs) 804, configuration and clocking logic (CONFIG/CLOCKS) 805, digital signal processing blocks (DSPs) 806, specialized input/output blocks (I/O) 807, for example, clock ports, and other programmable logic 808 such as digital clock managers, analog-to-digital converters, system monitoring logic, and so forth. Some FPGAs also include dedicated processor blocks (PROC) 810 and internal and external reconfiguration ports (not shown).

In some FPGAs, each programmable tile includes a programmable interconnect element (INT) 811 having standardized connections to and from a corresponding interconnect element in each adjacent tile. Therefore, the programmable interconnect elements taken together implement the programmable interconnect structure for the illustrated FPGA. The programmable interconnect element INT 811 also includes the connections to and from the programmable logic element within the same tile, as shown by the examples included at the top of FIG. 8.

For example, a CLB 802 can include a configurable logic element CLE 812 that can be programmed to implement user logic, plus a single programmable interconnect element INT 811. A BRAM 803 can include a BRAM logic element (BRL) 813 in addition to one or more programmable interconnect elements. Typically, the number of interconnect elements included in a tile depends on the height of the tile. A BRAM tile may have the same height as five CLBs, but other numbers (e.g., four) can also be used. A DSP tile 806 can include a DSP logic element (DSPL) 814 in addition to an appropriate number of programmable interconnect elements. An IOB 804 can include, for example, two instances of an input/output logic element (IOL) 815 in addition to one instance of the programmable interconnect element INT 811. As will be clear to those of skill in the art, the actual I/O bond pads connected, for example, to the I/O logic element 815, are manufactured using metal layered above the various illustrated logic blocks, and typically are not confined to the area of the input/output logic element 815.

A columnar area near the center of the die (shown shaded in FIG. 8) may be used for configuration, clock, and other control logic. Horizontal areas 809 extending from this column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic. For example, the processor block PROC 810 shown in FIG. 8 spans several columns of CLBs and BRAMs.

Note that FIG. 8 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 8 are purely exemplary. For example, in an actual FPGA, more than one adjacent column of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for modeling delays of interconnect circuits. Other aspects and features will be apparent to those skilled in the art from consideration of the specification. It is intended that the specification and drawings be considered as examples only, with a true scope of the invention being indicated by the following claims.

What is claimed is:

1. A method of generating delay values for instances of a circuit, comprising:
on a programmed processor, performing operations including:
inputting a plurality of contexts, wherein each context includes a respective delay value and a combination of possible types of a plurality of characteristics of the circuit, and each characteristic is of one type of a plurality of alternative types of the characteristic;
inputting a plurality of classification parameters, the classification parameters indicating selected ones of the characteristics, and each of the plurality of characteristics not indicated by a classification parameter being a non-selected characteristic;
selecting groups of contexts based on the plurality of classification parameters, wherein:
each group includes one or more of the contexts, and each context includes the plurality of characteristics; and
a combination of types of the selected characteristics in each context in a group is equal to the combination of types of the selected characteristics of each other context in the group;
determining for each group and from the contexts in each group, a mean and a standard deviation of the respective delay values; and
outputting the mean and standard deviation of each group.

2. The method of claim 1, wherein, a combination of types of the non-selected characteristics in each context in a group is not equal to the combination of types of the non-selected characteristics of any other context in the group.

3. The method of claim 1, wherein the combination of types of the selected characteristics in one group is not equal to the combination of types of the selected characteristics of each other group.

4. The method of claim 1, further comprising:
repeating the inputting of a plurality of classification parameters, selecting, determining, and outputting using a different plurality of classification parameters.

5. The method of claim 1, wherein the circuit is an interconnect circuit in a programmable integrated circuit (IC).

6. The method of claim 5, wherein the characteristics include driver mux, driver node, pre-driver mux, and pre-driver node, and types of the driver mux and pre-driver mux include different types of multiplexers, and types of the driver node and pre-driver node include different lengths of signal lines.

7. The method of claim 6, wherein the characteristics include capacitance and slew, and types of the capacitance include a plurality of ranges of capacitance values, and types of the slew include a plurality of ranges of slew values.

8. The method of claim 7, wherein the characteristics include tile crossings of the driver node and tile crossings of the pre-driver node, each type of tile crossing of the driver node indicates a type of tile of the programmable IC that the driver node crosses, and each type of tile crossing of the pre-driver node indicates a type of tile of the programmable IC that the pre-driver node crosses.

9. A method of generating delay values for instances of a circuit, comprising:
on a programmed processor, performing operations including:
inputting a plurality of contexts, wherein each context includes a respective delay value and a combination of possible types of a plurality of characteristics of the circuit, and each characteristic is of one type of a plurality of alternative types of the characteristic;
inputting a plurality of sets of classification parameters, the classification parameter in each set indicating selected ones of the plurality of characteristics, and each of the plurality of characteristics not indicated by a classification parameter being a non-selected characteristic;
for each set of classification parameters performing operations including:
selecting groups of contexts based on the classification parameters of the set, wherein:
each group includes one or more of the contexts, and each context includes the plurality of characteristics; and
a combination of types of the selected characteristics in each context in a group is equal to the combination of types of the selected characteristics of each other context in the group;
determining for each group and from the contexts in each group, a respective mean and a respective standard deviation of the respective delay values;
determining from the respective standard deviations, a composite mean of the respective standard deviations and a composite standard deviation for the set of classification parameters;
selecting one of the sets of classification parameters based on the composite standard deviations for the plurality of sets of classification parameters; and
outputting data indicating the selected one set of classification parameters.

10. The method of claim 9, wherein, a combination of types of the non-selected characteristics in each context in a group is not equal to the combination of types of the non-selected characteristics of any other context in the group.

11. The method of claim 9, wherein the combination of types of the selected characteristics in one group is not equal to the combination of types of the selected characteristics of each other group.

12. The method of claim 9, wherein the circuit is an interconnect circuit in a programmable integrated circuit (IC).

13. The method of claim 12, wherein the characteristics include driver mux, driver node, pre-driver mux, and pre-driver node, and types of the driver mux and pre-driver mux include different types of multiplexers, and types of the driver node and pre-driver node include different lengths of signal lines.

14. The method of claim 13, wherein the characteristics include capacitance and slew, and types of the capacitance include a plurality of ranges of capacitance values, and types of the slew include a plurality of ranges of slew values.

15. The method of claim 14, wherein the characteristics include tile crossings of the driver node and tile crossings of the pre-driver node, each type of tile crossing of the driver node indicates a type of tile of the programmable IC that the driver node crosses, and each type of tile crossing of the pre-driver node indicates a type of tile of the programmable IC that the pre-driver node crosses.

16. A system for generating delay values for instances of a circuit, comprising:
a memory arrangement;
a processor coupled to the memory arrangement, wherein the memory arrangement is configured with instructions that when executed by the processor cause the processor to perform operations including:
inputting a plurality of contexts, wherein each context includes a respective delay value and a combination of possible types of a plurality of characteristics of the circuit, and each characteristic is of one type of a plurality of alternative types of the characteristic;
inputting a plurality of classification parameters, the classification parameters indicating selected ones of the characteristics, and each of the plurality of characteristics not indicated by a classification parameter being a non-selected characteristic;
selecting groups of contexts based on the plurality of classification parameters, wherein:
each group includes one or more of the contexts, and each context includes the plurality of characteristics; and
a combination of types of the selected characteristics in each context in a group is equal to the combination of types of the selected characteristics of each other context in the group;
determining for each group and from the contexts in each group, a mean and a standard deviation of the respective delay values; and
outputting the mean and standard deviation of each group.

17. The system of claim 16, wherein, a combination of types of the non-selected characteristics in each context in a group is not equal to the combination of types of the non-selected characteristics of any other context in the group.

18. The system of claim 16, wherein the combination of types of the selected characteristics in one group is not equal to the combination of types of the selected characteristics of each other group.

19. The system of claim 16, wherein the circuit is an interconnect circuit in a programmable integrated circuit (IC).

20. The system of claim 19, wherein the characteristics include driver mux, driver node, pre-driver mux, and pre-driver node, and types of the driver mux and pre-driver mux include different types of multiplexers, and types of the driver node and pre-driver node include different lengths of signal lines.

* * * * *